United States Patent [19]
Cucheran

[11] Patent Number: 5,470,003
[45] Date of Patent: * Nov. 28, 1995

[54] ADJUSTABLE CROSS RAIL FOR A VEHICLE ARTICLE CARRIER

[75] Inventor: John S. Cucheran, Lake Orion, Mich.

[73] Assignee: JAC Products, Inc., Ann Arbor, Mich.

[ * ] Notice: The portion of the term of this patent subsequent to Dec. 28, 2010, has been disclaimed.

[21] Appl. No.: 160,952

[22] Filed: Dec. 1, 1993

Related U.S. Application Data

[63] Continuation of Ser. No. 966,260, Oct. 26, 1992, Pat. No. 5,273,195.

[51] Int. Cl.$^6$ .................................................. B60R 9/00
[52] U.S. Cl. ........................ 224/316; 224/321; 224/326
[58] Field of Search .................................. 224/309, 310, 224/314, 316, 320, 321, 325, 326, 327, 329

[56] References Cited

U.S. PATENT DOCUMENTS

| | | |
|---|---|---|
| 3,002,664 | 10/1961 | Guevara .................................. 224/314 |
| 3,165,353 | 1/1965 | Weise . |
| 4,501,385 | 2/1985 | Bott . |
| 4,673,119 | 6/1987 | Bott . |
| 5,069,377 | 12/1991 | Baughman . |
| 5,096,106 | 3/1992 | Foster et al. . |

FOREIGN PATENT DOCUMENTS

| | | | |
|---|---|---|---|
| 172752 | 3/1952 | Germany ................................ 224/314 |
| 15040 | 1/1982 | Japan ..................................... 224/309 |

Primary Examiner—Linda J. Sholl
Attorney, Agent, or Firm—Harness, Dickey & Pierce

[57] ABSTRACT

A vehicle article carrier having an adjustable cross rail. The vehicle article carrier includes a pair of side rails positioned longitudinally along an outer body surface of a vehicle such as a roof. The side rails each include a side rail member and a pair of brackets secured fixedly to the side rail member at opposite ends of the side rail member. The brackets are further fixedly secured to the outer body surface. Each of the side rail members and a selected pair of the brackets include channels formed therein in communication with each other. A cross rail is positioned perpendicularly between the channels and is movable slidably between an operative position between the side rail members, elevationally above the outer body surface, and a stored position between the selected pair of brackets closely adjacent the outer body surface. In the stored position the cross rail offers minimal wind resistance and generates minimal wind noise even when the vehicle is traveling at relatively high speeds. A thumbwheel is disposed within the cross rail and operatively connected to a threaded shaft and locking nut to enable the cross rail to be manually, releasably secured at desired positions along the side rail members and the pair of brackets.

10 Claims, 2 Drawing Sheets

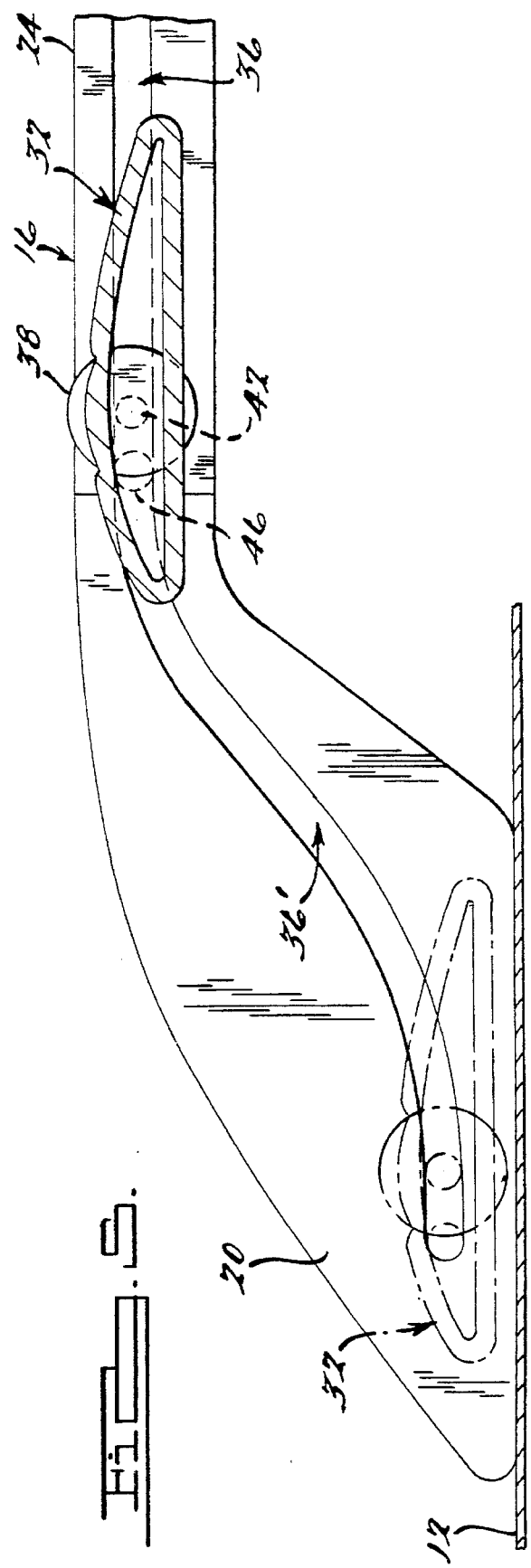

ADJUSTABLE CROSS RAIL FOR A VEHICLE ARTICLE CARRIER

CROSS REFERENCE TO RELATED APPLICATION

The present application is a continuation of U.S. application Ser. No. 07/966,260, filed Oct. 26, 1992 now U.S. Pat. No. 5,273,195.

TECHNICAL FIELD

The present invention is related to vehicle article carriers for removably securing cargo elevationally above an outer body surface of a vehicle, and more particularly to a vehicle article carrier incorporating side rails and bracket members including channels formed therein which enable a cross rail to be placed in a stored position closely adjacent the outer body vehicle surface when the vehicle article carrier is not in use.

DISCUSSION

Vehicle articles are used in a wide variety of applications to secure cargo removably and elevationally above an outer body surface of a vehicle when using the vehicle to transport the cargo. Such carriers typically include a pair of side rails placed parallel with each other which extend longitudinally along and above the outer body surface (i.e., roof) of the vehicle. A plurality of brackets at terminal ends of each of the side rails may be secured to the outer body surface of the vehicle to help support the side rails elevationally above the outer body surface. At least one cross rail typically extends perpendicularly between the side rails to provide a means by which cargo may supported removably thereon so as not to damage the outer body surface. Frequently, at least one of the cross rails is adjustable to enable it to be placed longitudinally at various positions along the side rails.

It is an important consideration that the cross sectional shape of the cross rail, or cross rails, of a vehicle article carrier system be shaped in an aerodynamic manner to reduce as much as possible any unnecessary wind noise and/or wind drag which may be present when the cross rail(s) are secured between the side rails and no load is being supported thereon. An aerodynamic shape helps to reduce any unnecessary wind noise and/or wind drag which might be occasioned when the cross rails are in position between the side rails and no load is being transported on the cross rails.

While providing an aerodynamic shape for each cross rail of a vehicle article carrier system helps significantly to reduce wind noise and/or wind drag, it would be highly desirable if any such wind noise or wind drag could be even further reduced when the vehicle article carrier is not being used to support cargo thereon. More specifically, it would be highly advantageous if one or more of the cross rails of the vehicle article carrier system was capable of being positioned closely adjacent the outer body vehicle surface when the vehicle article carrier is not in use.

Accordingly, it is a principal object of the present invention to provide a vehicle article carrier having a cross rail which may be positioned closely adjacent the outer body surface of a vehicle, such as a roof of a vehicle, to thereby significantly reduce or eliminate wind drag and wind noise which would otherwise be generated when the cross rail is in its elevated position above the outer body surface, ready for use, but not being used.

It is yet another object of the present invention to provide a vehicle article carrier having an adjustable cross rail which may be quickly and easily manually locked in either a stored position, wherein it is positioned closely adjacent an outer body vehicle surface such as a roof, or in an elevated position ready to support cargo thereon.

It is yet another object of the present invention to provide a vehicle article carrier having an adjustable cross rail which is aerodynamically shaped to further reduce wind noise and wind drag whether the cross rail is in an elevated position ready for use, or in a stored position disposed closely adjacent an outer body surface of a vehicle.

SUMMARY OF THE INVENTION

The above and other objects are provided by a vehicle article carrier having an adjustable cross rail in accordance with a preferred embodiment of the present invention. The vehicle article carrier generally includes a pair of side rails which are disposed longitudinally and parallel to each other along an outer body vehicle surface such as a roof of a vehicle. Each of the side rails generally include at least one bracket and one side rail member which are secured together, and which further each include means forming a channel therein. In the preferred embodiment the means for forming a channel provides a longitudinally continuous channel which extends along the side rail member and bracket portions of the side rails. A cross rail is disposed perpendicularly between the side rails and includes means for engaging the channels formed in each of the side rails. The cross rail further includes locking means for releasably securing the cross rail at desired positions along the side rails.

The channels formed in the bracket portions of each of the side rails preferably slopes downwardly to a position closely adjacent the outer body surface of the vehicle. Accordingly, the cross rail may be slidably moved throughout the channels formed in each of the side rails to a "stored" position closely adjacent the outer body vehicle surface when the cross rail is not in use. The ability to position the cross rail in the stored position significantly reduces or eliminates wind noise and wind drag which might be experienced if the cross rail remained positioned at various locations along the side rail members.

When it is desired to use the vehicle article carrier to transport cargo, the cross rail may be moved from its stored position closely adjacent the outer body surface along the channels formed in each of the side rails to a more elevated position extending between the side rail members. Cargo can then be placed on the cross rail and supported elevationally above the outer body surface.

In the preferred embodiment the cross rail further includes locking means for releasably securing the cross rail at any desired location along the channels formed in the side rails. Accordingly, the cross rail may be releasably secured in its stored position closely adjacent the outer body vehicle surface or elevationally above the outer body vehicle surface at virtually any point along the length of the side rail members or bracket portions. The locking means is further manually engageable so as not to require any special or conventional tools to secure or release the cross rail at a desired position. By enabling the cross rail to be positioned at a point closely adjacent the outer body vehicle surface, wind noise and wind drag which might otherwise be experienced when the cross rail is positioned elevationally above the outer body vehicle surface at some point along the side rail members is significantly reduced or eliminated.

BRIEF DESCRIPTION OF THE DRAWINGS

The various advantages of the present invention will become apparent to one skilled in the art by reading the following specification and subjoined claims and by referencing the following drawings in which:

FIG. 3 is an end view of the cross rail of FIG. 2 taken in accordance with section line 3—3;

FIG. 4 is a cross sectional view of the cross rail of FIG. 2 releasably coupled to the side rail of FIG. 2 and taken in accordance with section line 4—4 of FIG. 2; and FIG. 5 is an end view of the cross rail of FIG. 2 taken in accordance with directional arrow 5 in FIG. 2 showing the cross rail in elevation in its elevated position above the outer body vehicle surface and in phantom in its stored position disposed closely adjacent the outer body vehicle surface.

DETAILED DESCRIPTION OF THE PREFERRED EMBODIMENT

Figure 1:
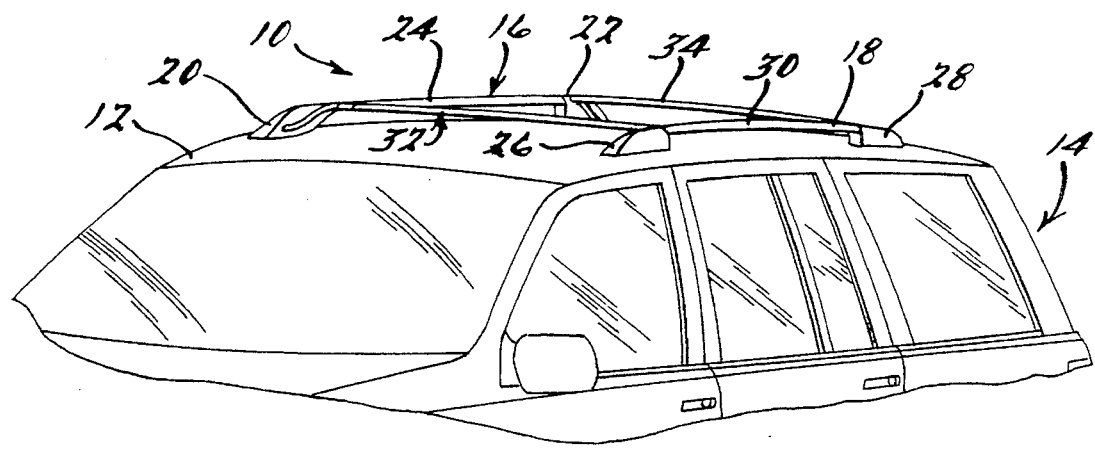
FIG. 1 is a perspective view of a vehicle article carrier including an adjustable cross rail in accordance with a preferred embodiment of the present invention.

Referring to FIG. 1, there is shown a vehicle article carrier 10 in accordance with a preferred embodiment of the present invention secured to an outer body vehicle surface 12, in this instance a roof, of a vehicle 14. The vehicle article carrier 10 includes a pair of side rails 16 and 18 which are disposed parallel to each other and longitudinally along the outer body vehicle surface 12.

Side rail 16 is comprised of bracket portions 20 and 22 and a side rail member 24 secured fixedly therebetween. The bracket portions 20 and 22 are further fixedly securd to the outer body vehicle surface 12. Side rail 18 is similarly comprised of a pair of bracket portions 26 and 28 and a side rail member 30 secured fixedly therebetween, with bracket portions 26 and 28 being fixedly secured to the outer body vehicle surface 12. Secured releasably between the side rails 16 and 18 is an adjustable cross rail 32 which is disposed perpendicularly between the side rails 16 and 18 and generally parallel to the outer body vehicle surface 12. A fixed cross rail 34 is fixedly disposed between bracket portions 22 and 28, although it should be appreciated that fixed cross rail 34 could instead be an adjustable cross rail positioned between the side rails 16 and 18 if so desired. It will be appreciated that the side rails 16 and 18 are preferably identical in construction. Thus, for discussion purposes, only side rail 16 will be described in detail, with it being understood that the construction of side rail 18 is identical and complementary.

Figure 2:
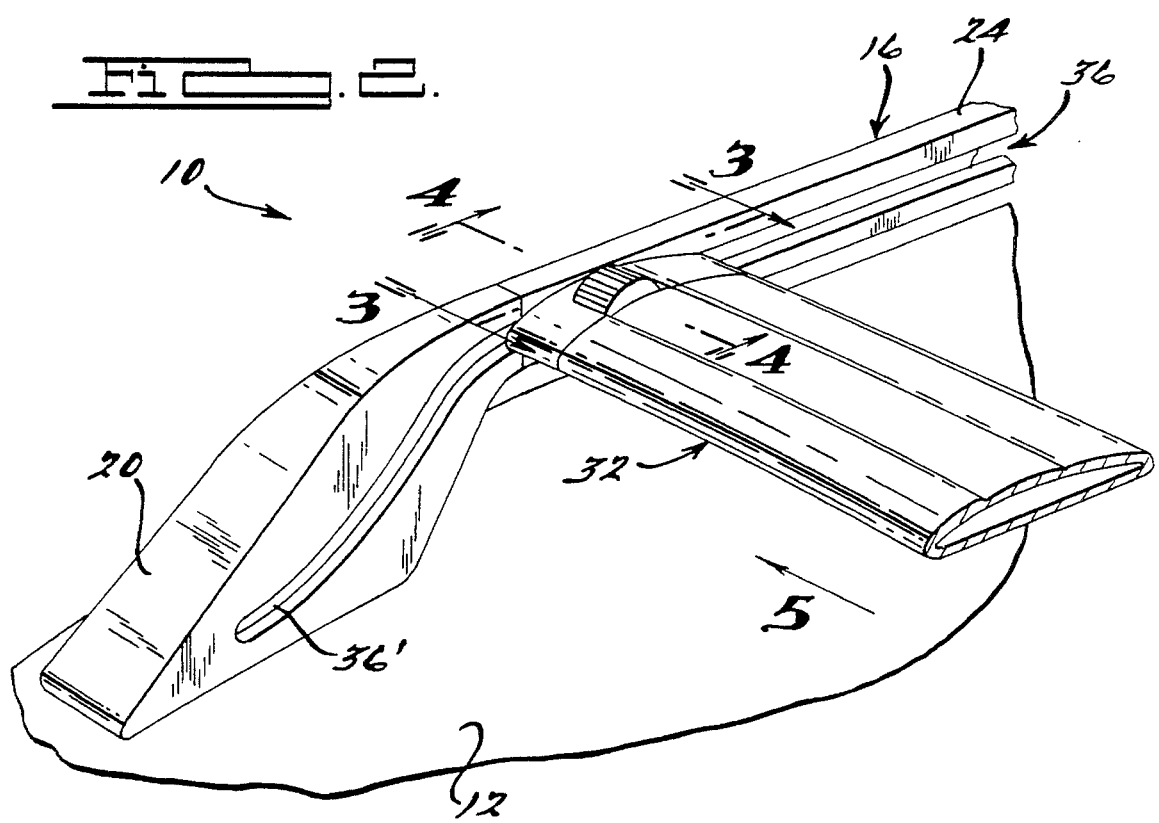
FIG. 2 is a fragmentary, perspective view of a portion of one of the side rails shown in FIG. 1 and a portion of the adjustable cross rail.

Referring to FIG. 2, a portion of the side rail 16 and a portion of the adjustable cross rail 32 are shown with the cross rail 32 releasably secured to the side rail 16. The side rail member 24 includes a channel 36 formed longitudinally therein and extending preferably the entire length of the side rail member 24 in a first plane. The bracket portion 20 similarly includes a channel 36'. Channel 36' slopes very gradually downwardly to a position at a second plane spaced vertically below the first plane and closely adjacent the outer body vehicle surface 12, and at its opposite end is longitudinally aligned With and in communication with channel 36 to form a single, continuous, longitudinally extending channel between the bracket portion 20 and the side rail member 24. The cross rail 32 is preferably aerodynamically shaped in the form of an air foil to further help significantly reduce wind drag and wind noise which might otherwise be present when the cross rail 32 is in its elevated position as shown in FIG. 2.

It is a principal object of the present invention that the cross rail 32 can be adjustably positioned in its elevated position, as shown in FIG. 2, or moved slidably in accordance with the path defined by channels 36 and 36' of side rail member 24 and bracket portion 20, respectively, to a position closely adjacent the outer body vehicle surface 12 when the cross rail 32 is not in use. Accordingly, the cross rail 32 of the vehicle article carrier 10 has both an operative position, such as shown in FIG. 2, where the cross rail 32 is positioned elevationally well above the outer body vehicle surface 12 at any point along channel 36, and therefore capable of supporting cargo thereon clearly above the outer body vehicle surface 12, as well as a "stored" position. In the stored position the cross rail 32 is manually moved in accordance with the path defined by channel 36' to a position closely adjacent the outer body vehicle surface 12. When placed at the lowermost portion of channel 36', the cross rail 32 offers very little resistance to wind, and thus generates only an extremely small amount of wind drag and wind noise when the vehicle 14 is travelling.

Referring now to FIGS. 3 and 4, the structure of the cross rail 32 can be seen more clearly. The cross rail 32 includes releasable locking means in the form of a rotatable thumbwheel 38 which is mounted for rotational movement within a cut-out 40 of the cross rail 32. The thumbwheel 38 includes a threaded shaft 42 which is securely fixed to the thumbwheel 38 so that movement of the thumbwheel 38 causes a corresponding rotation of the threaded shaft 42. The threaded shaft 42 extends through a locking nut 44 (FIG. 4) disposed within channel 36. The channels 36 and 36' have sufficient area to enable the locking nut 44 to move freely therewithin along the side rail member 24 and bracket portion 20, or between its operative and stored positions. It will also be appreciated that the opposite end of the cross rail 32 preferably includes a thumbwheel, threaded shaft and locking nut identical to that described above for releasably securing the opposite end of the cross rail 32 to side rail 18.

In operation, when it is desired to releasably lock the cross rail 32 at a desired position along the side rail member 24, or in a stored position inbetween bracket portions 20 and 26, the thumbwheel 38 is rotated in a first direction to loosen the locking nut 44. This provides some clearance between the locking nut and the surfaces of the terminal ends 24a and 24b of the channel 36, thus enabling the cross rail 32 to be moved slidably along the side rail members 24 and 30 and bracket portions 22 and 26. When the cross rail 32 is positioned as desired, the thumbwheel 38 is rotated in the opposite direction to tighten the locking nut 44 against the terminal ends 24a and 24b of channel 36. The cross rail 32 will then be securely clamped at the desired position. It will also be appreciated that channel 36' is shaped identically in cross section to channel 36 to enable the threaded shaft 42 to move freely therewithin from channel 36.

With brief reference again to FIG. 3, the cross rail 32 further includes a post member 46 protruding outwardly therefrom to help maintain the cross rail 32 generally parallel to the outer body vehicle surface 12 when the cross rail 32 is in its operative or stored positions. It will be appreciated, however, that a wide variety of implements could be incorporated in lieu of post 46 to maintain the cross rail 32 generally parallel to the outer body vehicle surface 12. For example, a sleeve or shoulder portion may be incorporated at the outermost longitudinal end portions of the cross rail member 32 through which threaded shafts such as threaded shaft 42 may extend. Such sleeve or shoulder portions may further have a length which enables them to extend partially into the channels 36 and 36' to thereby help stabilize the cross rail 32 and prevent rotational movement of the cross rail 32 relative to the channels 36 and 36'. Thus, it will be appreciated by those of ordinary skill in the art that a wide variety of means may easily be incorporated to prevent the cross rail 32 from moving rotationally relative to the channels 36 and 36', and that the post member 46 is merely intended as a representative one of such means to stabilize the cross rail 32.

It will also be appreciated that the locking thumbwheel 38 and threaded shaft 42 could easily be substituted for a wide variety of locking mechanisms which will clampingly secure the cross rail 32 to the channels 36 and 36'. Examples of mechanisms which may be adapted for such use appear in the following U.S. patents, the disclosures of which are each hereby incorporated by reference:

| | |
|---|---|
| 5,082,158 | 4,673,119 |
| 4,982,886 | 4,239,139 |
| 4,972,983 | 4,162,755 |
| 4,684,048 | 3,554,416 |

Referring to FIG. 5, the cross rail 32 can be seen in its operative and stored positions. In its operative position, as shown in elevation, the cross rail 32 is positioned along the side rail member 24. The cross rail 32 is also shown in phantom in its stored position closely adjacent the outer body vehicle surface 12. It will also be appreciated that the shape of channel 36', while being shown in FIG. 5 as curving very gradually, could be shaped to curve much more abruptly if desired for a particular application provided suitable structure such as a shoulder or sleeve portion circumscribing threaded shaft 42 is included in lieu of post 46 to enable the cross rail 32 to follow a more angled path than might be permitted by post 46.

As can further be seen in FIG. 5, when the cross rail 32 is in its stored position (as shown in phantom) it will offer minimal wind resistance and generate minimal wind noise when the vehicle 14 is travelling even at relatively high speeds such as those attained on a highway. It will also be appreciated that if alternative clamping means are used such as those disclosed in the above-referenced patents, which have heretofore been incorporated by reference, that the cross rail 32 may require no clearance between its lower surface and the outer body vehicle surface 12, and may therefore be able to rest directly against the outer body vehicle surface 12.

The cross rail 32, side rail member 24 and bracket portion 20 are all constructed of lightweight, rigid materials, and preferably of materials such as steel, plastic, or aluminum and may be constructed from one or more of a variety of conventional techniques such as stamping, roll forming or molding.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

I claim:

1. A vehicle article carrier comprising:

a pair of laterally spaced apart side rail members positioned generally parallel to one another and extending longitudinally along an outer body surface of a vehicle;

a cross bar extending transversely between said side rail members for supporting articles above said outer body surface; and a channel associated with at least one of said side rail members for adjustably supporting said cross bar for slidable movement along said side rail members along a first plane and for slidable movement between said first plane and a second plane spaced vertically apart from said first plane, such that when said cross bar is positioned in said second plane said cross bar is disposed in close proximate relation to said outer body surface of said vehicle, and when said cross bar is moved slidably from said second plane into said first plane said cross bar is disposed in a position spaced vertically above said second plane, and therefore above said outer body surface of said vehicle.

2. The vehicle article carrier of claim 1, wherein each of said side rail members comprises at least one bracket for securing one of said side rail members to said outer body surface; and wherein said channel extends from said first plane to said second plane thereby defining a continuous path along which said cross bar may be moved along said first plane and between said first and second planes.

3. The vehicle article carrier of claim 2, wherein said cross bar comprises a manually engageable locking assembly for releasably securing said cross bar in said first and second planes.

4. The vehicle article carrier of claim 3, wherein said locking assembly includes:

a threaded locking nut adapted to fit within an interior area of said bracket member;

a threaded shaft extending outwardly of at least one end of said cross bar for threadably engaging with said threaded locking nut; and a wheel member fixedly secured to said threaded shaft for enabling easy manual rotation of said threaded shaft to thereby enable said cross bar to be quickly, releasably secured in said first and second planes.

5. A vehicle article carrier comprising:

a pair of side rail members extending longitudinally along a major length of an outer body surface of a vehicle, said side rail members being disposed generally parallel to one another;

at least one bracket member associated with each one of said side rail members for supporting each said side rail member elevationally above said outer body surface of said vehicle;

a cross bar disposed generally transversely of and between said side rail members for supporting articles thereon above said outer body surface;

a channel associated with each one of said bracket members for defining a continuous path providing a first position at which said cross bar is positioned above said outer body surface, and a second position vertically below said first position at which said cross bar is positioned closely adjacent said outer body surface of said vehicle to present a low profile for said cross bar relative to said outer body surface of said vehicle; and a manually engageable locking assembly associated with at least said cross bar for releasably securing said cross bar at each of said first and second positions.

6. The vehicle article carrier of claim 5, wherein said locking assembly comprises:

a threaded nut adapted to fit within an interior area of said bracket member;

a threaded shaft protruding outwardly of an end portion of said cross bar and adapted to rotate relative to said end portion; and a manually engageable wheel fixedly secured to said threaded shaft for rotating said threaded shaft in locking and unlocking directions to thereby allow said threaded locking nut to clamp said cross bar to each said bracket member at said first and second positions.

7. A vehicle article carrier comprising:

a pair of elongated side rail members positioned parallel to one another and extending longitudinally along a major length of an outer body surface of a vehicle;

a channel formed in each one of said side rail members;

at least one bracket member associated with each one of said side rail members for fixedly supporting each one of said side rail members above said outer body surface;

each one of said bracket members including a channel formed therein, said channel extending from a first position generally in line with said channel of its associated said side rail member to a second position closely adjacent said outer body surface and elevationally below said side rail member, said channel of each one of said bracket members having a generally curving, continuous shape;

a cross bar positioned between said side rail members and extending transversely of each of said side rail members; and a locking assembly associated with each outermost end portion of said cross bar for permitting said cross bar to be moved slidably along said channels of said bracket members and said channels of said side rail members and for releasably securing said cross bar in said first and second positions.

8. The vehicle article carrier of claim 7, wherein said locking assembly further includes:

a manually rotatable wheel member;

a threaded shaft fixedly secured to said wheel member so as to be rotatable with said wheel member; and a threaded locking nut adapted to be disposed within said channel of either one of said side rail members and within said at least one of said bracket members for supporting and guiding said cross bar longitudinally along an associated one of said channels of an associated one of said side rail members and between said first and second positions.

9. A vehicle article carrier comprising:

a pair of laterally spaced apart side rails adapted to be fixedly secured to an outer body surface of a vehicle;

at least one bracket member associated with each of said side rails and adapted to support its associated said side rail above said outer body surface; and a cross bar moveable slidably longitudinally along said side rails in a generally horizontal plane and moveable slidably along portions of said bracket members from a position along said generally horizontal plane into a storage position disposed vertically below said horizontal plane such that said cross bar is disposed closely adjacent said outer body surface of said vehicle.

10. A vehicle article carrier comprising:

a pair of elongated support members adapted to be fixedly secured to an outer body surface of a vehicle in spaced apart relation to each other;

a cross bar adapted to be secured between said support members so as to extend generally perpendicularly between said support members;

each of said support members defining a continuous path having a generally horizontally extending portion and a portion extending downwardly toward said outer body surface, said cross bar being moveable slidably along said continuous path such that when said cross bar is positioned along said horizontally extending portion, said cross bar is disposed at a first height above said outer body surface, and when said cross bar is moved slidably along said downwardly extending portion said cross bar is disposed at a second height which is closer to said outer body surface than said first height.

* * * * *

UNITED STATES PATENT AND TRADEMARK OFFICE
CERTIFICATE OF CORRECTION

PATENT NO. : 5,470,003

DATED : November 28, 1995

INVENTOR(S) : John S. Cucheran

It is certified that error appears in the above-indentified patent and that said Letters Patent is hereby corrected as shown below:

Col. 1, line 24, delete "articles" and insert therefor --article carrier--

Col. 1, line 35, after "may" insert --be--

Col. 3, line 40, "securd" should be --secure--

Col. 4, line 1, "With" should be --with--

Signed and Sealed this

Twenty-eighth Day of May, 1996

Attest:

BRUCE LEHMAN

Attesting Officer     Commissioner of Patents and Trademarks